US011383188B2

(12) United States Patent
Walker et al.

(10) Patent No.: US 11,383,188 B2
(45) Date of Patent: Jul. 12, 2022

(54) FILTER CAPSULE AND METHOD OF USE

(71) Applicant: Pall Corporation, Port Washington, NY (US)

(72) Inventors: Neil J. Walker, Waterlooville (GB); Charles N. Rothwell, Stoneleigh (GB); Robert Knowles, Southampton (GB)

(73) Assignee: Pall Corporation, Port Washington, NY (US)

( * ) Notice: Subject to any disclaimer, the term of this patent is extended or adjusted under 35 U.S.C. 154(b) by 238 days.

(21) Appl. No.: 16/434,252

(22) Filed: Jun. 7, 2019

(65) Prior Publication Data

US 2020/0384394 A1 Dec. 10, 2020

(51) Int. Cl.
*B01D 35/30* (2006.01)
*B01D 27/08* (2006.01)

(52) U.S. Cl.
CPC ............. *B01D 35/30* (2013.01); *B01D 27/08* (2013.01); *B01D 2313/20* (2013.01)

(58) Field of Classification Search
CPC .... B01D 36/001; B01D 27/08; B01D 29/114; B01D 2201/307; B01D 27/005; B01D 29/41; B01D 29/54; B01D 29/96; B01D 35/143; B01D 35/153; B01D 35/16; B01D 35/303; B01D 19/0031; B01D 2201/0415; B01D 2201/0423; B01D 2201/295; B01D 2201/313; B01D 2313/10; B01D 2313/16; B01D 2313/20; B01D 2313/23; B01D 2313/44; B01D 27/00; B01D 29/115; B01D 29/17; B01D 29/21; B01D 29/90; B01D 29/902; B01D 29/925; B01D 35/30; B01D 63/02; B01D 63/10; B01D 63/14; B01D 35/00; B01D 15/10; B01D 2201/088; B01D 2201/16; B01D 2201/302; B01D 2201/304; B01D 2201/342; B01D 2201/4015; B01D 2201/4084; B01D 2253/102; B01D 2253/206; B01D 2265/02; B01D 2313/02; B01D 2313/13; B01D 29/016;
(Continued)

(56) References Cited

U.S. PATENT DOCUMENTS 3,696,932 A * 10/1972 Rosenberg ............. B01D 35/00
210/437
4,126,559 A * 11/1978 Cooper .................. B01D 29/15
210/445

(Continued)

FOREIGN PATENT DOCUMENTS

CN 102743915 A 10/2012
CN 104981677 A 10/2015
(Continued)

OTHER PUBLICATIONS

Steridyne, Steridyne Filters, Mar. 4, 2010, p. 7,9,11 (Year: 2010).*
(Continued)

*Primary Examiner* — Bobby Ramdhanie
*Assistant Examiner* — Donovan Bui-Huynh
(74) *Attorney, Agent, or Firm* — Leydig, Voit & Mayer, Ltd.

(57) ABSTRACT

A module alignment element, and a filter capsule including the module alignment element, a method of filtering fluid using the filter capsule, and a system including the filter capsule, are disclosed.

14 Claims, 12 Drawing Sheets

(58) Field of Classification Search
CPC ...... B01D 29/111; B01D 29/15; B01D 29/52; B01D 29/58; B01D 35/02; B01D 36/003; B01D 36/02; B01D 39/18; B01D 46/0002; B01D 46/0012; B01D 46/10; B01D 46/521; B01D 46/543; B01D 53/0415; B01D 63/00; B01D 65/00; B01D 29/23; B01D 35/027; B01D 29/11; A61M 1/3627; F16K 31/528; F16L 23/032; F16L 23/04; F16L 23/06; F16L 23/10; F16L 37/248; F16L 47/14; Y10S 210/13; C02F 1/003

See application file for complete search history.

(56) References Cited

U.S. PATENT DOCUMENTS

| | | | |
|---|---|---|---|
| 4,361,483 A * | 11/1982 | Pall | B01D 27/005 210/445 |
| 4,964,984 A * | 10/1990 | Reeder | A61M 1/3627 210/188 |
| 5,965,019 A * | 10/1999 | Olsen | B01D 27/005 210/331 |
| 7,357,866 B2 | 4/2008 | Diemer et al. | |
| 7,731,849 B2 | 6/2010 | Diemer et al. | |
| 8,535,529 B2 | 9/2013 | Allot et al. | |
| 2004/0094467 A1* | 5/2004 | Diemer | B01D 35/143 210/347 |
| 2006/0169630 A1* | 8/2006 | Gutman | B01D 36/001 210/248 |
| 2014/0202944 A1* | 7/2014 | Wes | C02F 1/001 210/234 |
| 2015/0174514 A1* | 6/2015 | Lin | B01D 63/14 96/11 |
| 2017/0028326 A1 | 2/2017 | Till et al. | |
| 2018/0193776 A1 | 7/2018 | Hacker | |

FOREIGN PATENT DOCUMENTS

| | | |
|---|---|---|
| CN | 106255850 A | 12/2016 |
| CN | 107110758 A | 8/2017 |
| DE | 4430341 A1 | 3/1995 |
| DE | 10 2018 116 471 A1 | 1/2019 |
| GB | 1532102 A | 11/1978 |
| GB | 2327369 A | 1/1999 |
| JP | H-0634709 U | 5/1994 |
| JP | 2011-526201 A | 10/2011 |
| JP | 2016-501125 A | 1/2016 |
| JP | 2018-508341 A | 3/2018 |
| WO | 2010/000356 A2 | 1/2010 |
| WO | WO 2016/109230 A2 | 7/2016 |

OTHER PUBLICATIONS

Pall'LS, Preparation, Use, and Integrity Testing of Pall Ultipor® VF DV20 Filter Cartridges and Capsules, Jun. 2, 2013 (Year: 2013).*
European Patent Office, Extended European Search Report in counterpart European Patent Application No. 20170417.8, dated Aug. 19, 2020.
Singapore Patent Office, Search Report in counterpart Singapore Patent Application No. 10202003563T, dated Apr. 8, 2021.
China National Intellectual Property Administration, Office Action in counterpart Chinese Application No. 202010439521.2, dated Sep. 10, 2021.

* cited by examiner

SECTION X-X

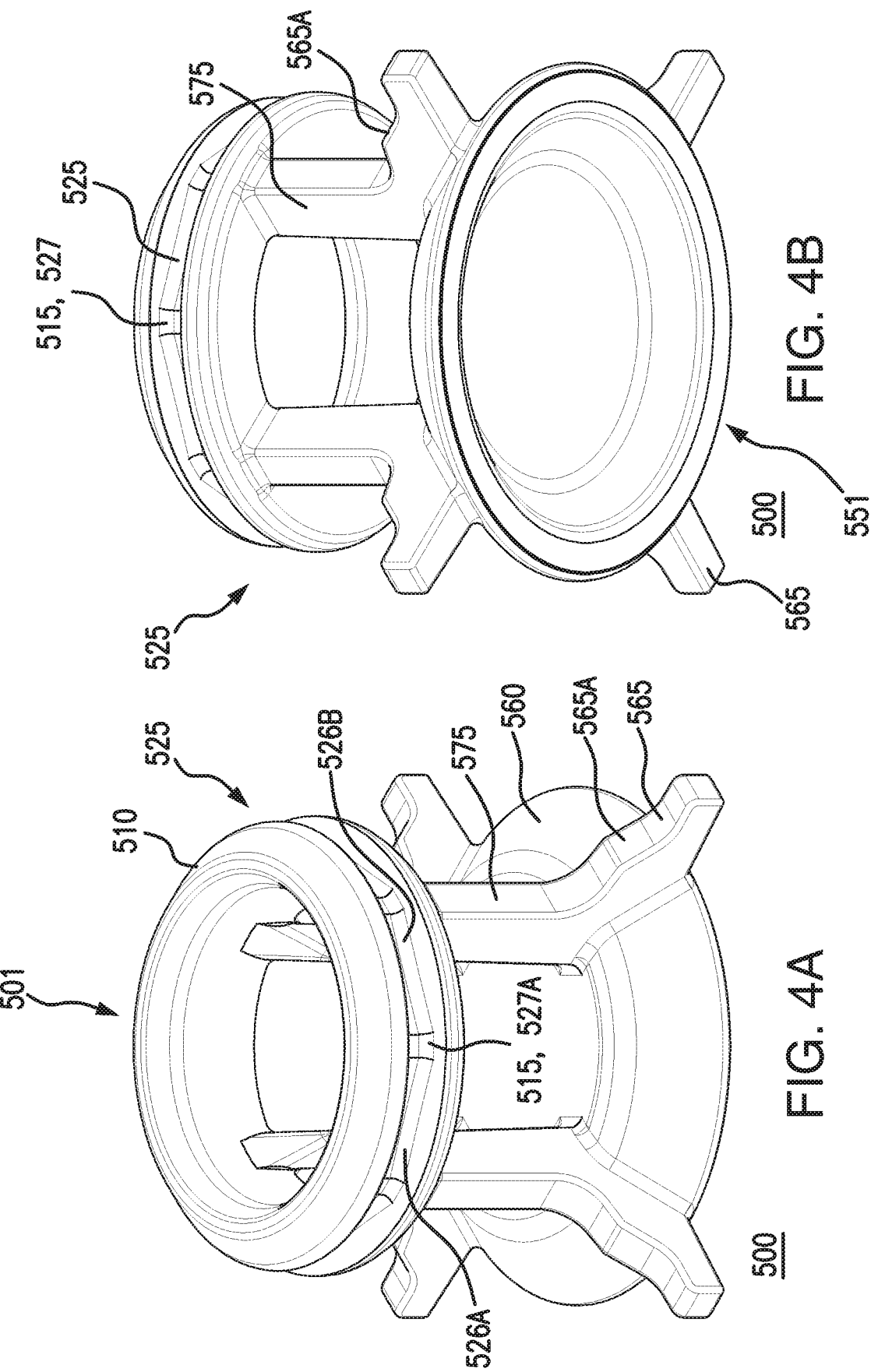

Section T-T

FILTER CAPSULE AND METHOD OF USE

BACKGROUND OF THE INVENTION

A variety of filter capsules are commercially available, and can be designed for "outside-in" flow or "inside-out flow." They can be available in a variety of lengths, using a number of moldings of varying lengths, each with a sealed joint to create a capsule assembly. Typically, the moldings have mold draft angles.

However, there is a need for improved filter capsules.

The present invention provides for ameliorating at least some of the disadvantages of the prior art. These and other advantages of the present invention will be apparent from the description as set forth below.

BRIEF SUMMARY OF THE INVENTION

An embodiment of the invention provides a module alignment element for use in a filter device comprising an open top end, and a closed bottom end comprising a base, the open top end and the closed bottom end being connected by a plurality of spaced apart vertically arranged struts, the open top end including a chamfered upper surface or a beveled upper surface, and an outer side wall including a circumferential groove containing a resilient ring, the circumferential groove including two or more flattened portions formed in the side wall; the base comprising a plurality of horizontally and radially arranged outwardly extending ears.

In another embodiment, a filter capsule is provided comprising (a) a hollow filter capsule housing having an upper hollow housing portion including an inlet, the upper hollow housing portion including an upper bowl portion, a secondary upper bowl portion including a secondary upper bowl portion fluid flow port and a secondary upper bowl portion inner diameter; an intermediate hollow housing portion; a lower hollow housing portion including an outlet, the lower hollow housing portion including a lower bowl portion, a secondary lower bowl portion including a secondary lower bowl portion fluid flow port; and defining a fluid flow path between the upper hollow housing portion and the lower hollow housing portion; (b) a filter module comprising a hollow cylindrical porous filter arranged between an inner core and an outer cage, wherein the filter module is arranged in the housing across the fluid flow path, the filter module having an upper end cap with a central opening and a lower end cap with a central opening; (c) a module alignment element, arranged in the upper hollow housing portion and arranged to contact the upper end cap of the filter module, the module alignment element comprising an open top end, and a closed bottom end comprising a base, the open top end and the closed bottom end being connected by a plurality of spaced apart vertically arranged struts, the open top end including an outer side wall including a circumferential groove containing a resilient ring, the circumferential groove including two or more flattened portions formed in the side wall; the base comprising a plurality of horizontally arranged outwardly extending ears, the horizontally arranged outwardly extending ears extending beyond the inner diameter of the secondary upper bowl portion; and, (d) a hollow cylindrical cap end, arranged in the lower hollow housing portion and contacting the lower end cap of the filter module, the hollow cap end comprising a side wall including at least one circumferential groove containing a resilient ring, the resilient ring providing a seal when the cap end is arranged in the lower hollow housing portion.

In other embodiments, systems including embodiments of the filter capsule, and methods of processing fluid using embodiments of the filter capsule, are provided.

BRIEF DESCRIPTION OF THE SEVERAL VIEWS OF THE DRAWING(S)

FIG. 1 is an external side view of a filter capsule according to an embodiment of the invention, wherein the inlet end includes a sanitary flange fluid connection, and the outlet end includes a hose barb fluid connection. FIG. 1 also shows actuator knobs for upper and lower valves, wherein the actuator knob for the upper valve is in the open position, and the actuator knob for the lower valve is in the closed position.

FIG. 2 is a cross-sectional side view of the filter capsule shown in FIG. 1 along line Y-Y, showing a capsule housing including an upper valve, a filter cartridge including a module alignment element including an o-ring in the module alignment element groove, a filter module, and a cap end.

FIG. 3A is a cross-sectional side view of the filter capsule shown in FIG. 1 along line X-X, showing an upper (vent) valve and a lower (drain) valve, wherein the upper valve is in the open position, and the lower valve in the closed position, wherein the valves are illustrated in a format to connect with quick release connectors, and wherein the valves connect the internal, upstream side of the filter module to the external environment of the filter capsule.

FIGS. 4A and 4B are perspective views of the embodiment of the module alignment element shown in FIG. 1, without the o-ring in the groove, wherein the groove includes flattened portions.

DETAILED DESCRIPTION OF THE INVENTION

Figure 1:
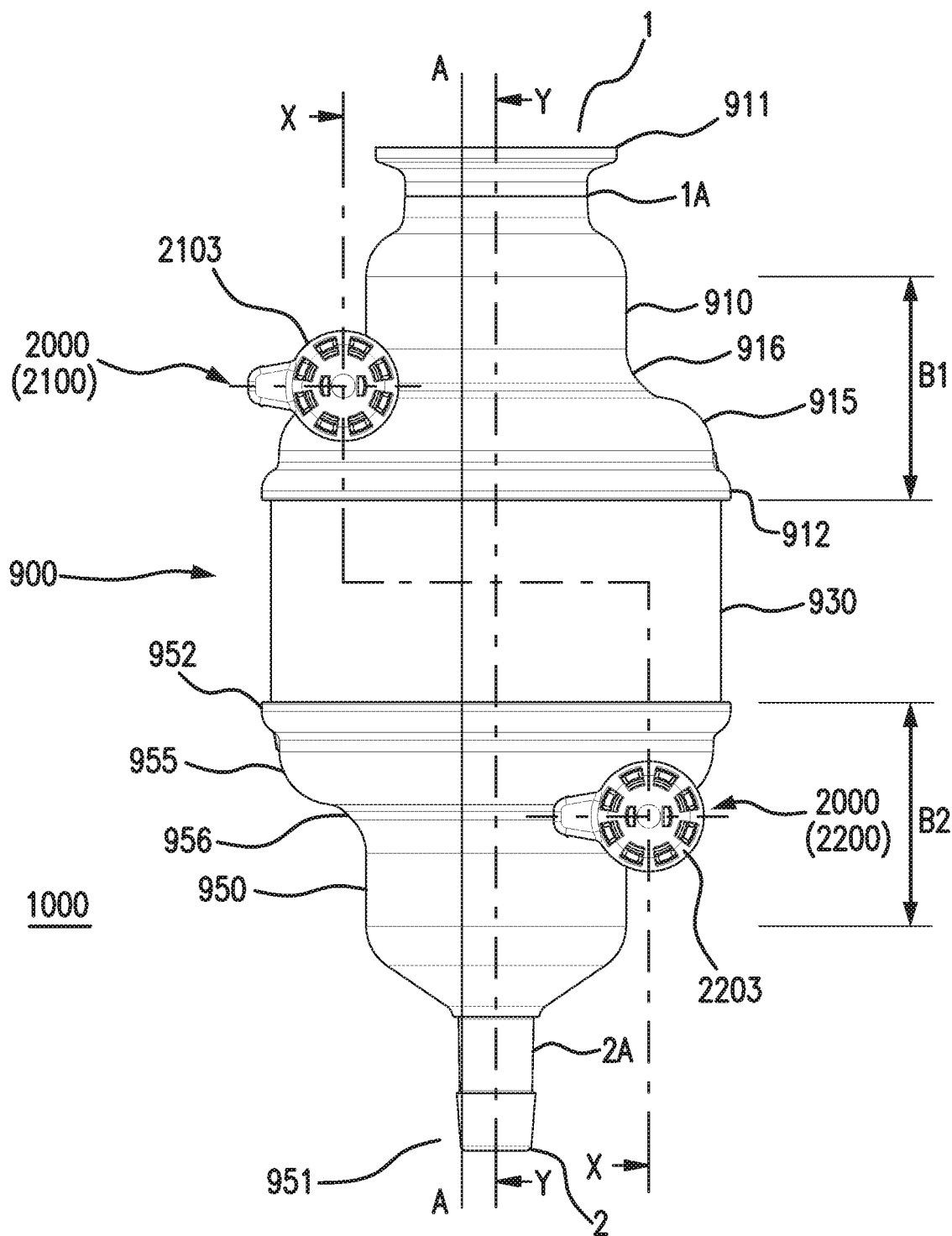

In accordance with an embodiment of the invention, a module alignment element for use in a filter device is provided, the module alignment element comprising an open top end, and a closed bottom end comprising a base, the open top end and the closed bottom end being connected by a plurality of spaced apart vertically arranged struts, the open top end including a chamfered upper surface or a beveled upper surface, and an outer side wall including a circumferential groove containing a resilient ring, the circumferential groove including two or more flattened portions formed in the side wall; the base comprising a plurality of horizontally and radially arranged outwardly extending ears.

In another embodiment, a filter capsule is provided comprising (a) a hollow filter capsule housing having an upper hollow housing portion including an inlet, the upper hollow housing portion including an upper bowl portion, a secondary upper bowl portion including a secondary upper bowl portion fluid flow port and a secondary upper bowl portion inner diameter; an intermediate hollow housing portion; a lower hollow housing portion including an outlet, the lower hollow housing portion including a lower bowl portion, a secondary lower bowl portion including a secondary lower bowl portion fluid flow port; and defining a fluid flow path between the upper hollow housing portion and the lower hollow housing portion; (b) a filter module comprising a hollow cylindrical porous filter arranged between an inner core and an outer cage, wherein the filter module is arranged in the housing across the fluid flow path, the filter module having an upper end cap with a central opening and a lower end cap with a central opening; (c) a module alignment element, arranged in the upper hollow housing portion and arranged to contact the upper end cap of the filter module, the module alignment element comprising an open top end, and a closed bottom end comprising a base, the open top end and the closed bottom end being connected by a plurality of spaced apart vertically arranged struts, the open top end including an outer side wall including a circumferential groove containing a resilient ring, the circumferential groove including two or more flattened portions formed in the side wall; the base comprising a plurality of horizontally arranged outwardly extending ears, the horizontally arranged outwardly extending ears extending beyond the inner diameter of the secondary upper bowl portion; and, (d) a hollow cylindrical cap end, arranged in the lower hollow housing portion and contacting the lower end cap of the filter module, the hollow cap end comprising a side wall including at least one circumferential groove containing a resilient ring, the resilient ring providing a seal when the cap end is arranged in the lower hollow housing portion.

In other embodiments, systems including embodiments of the filter capsule, and methods of processing fluid using embodiments of the filter capsule, are provided.

For example, in one embodiment of a method for filtering fluid according to the invention, a fluid is passed through an embodiment of the filter capsule, wherein the fluid is passed from the inlet, through the filter module, the module alignment element, the hollow cylindrical end cap, and the outlet.

Embodiments of the method can also include opening and closing valves for one or more of any of the following: venting air, draining fluid, integrity testing, and taking samples. Alternatively, or additionally, in some embodiments, e.g., wherein it is desirable to recover as much filtered fluid as possible, after fluid has been passed through the filter capsule, air can be introduced at the inlet or at the upper valve, upstream of the filter medium, at an elevated pressure, to "blow down" remaining fluid through the outlet.

Embodiments of systems according to embodiments of the invention comprise an embodiment of a filter capsule and any one or more of the following: at least one container (such as a source container), one or more conduits, a bioreactor, a chromatography device (e.g., chromatography column and/or a membrane chromatography device), a tangential flow filtration device, a concentration device and/or a diafiltration device. Filter capsules can be arranged upstream and/or downstream of other devices, and can provide for anyone or more of the following: sterile filtration of liquids and/or gas, depth filtration, bioburden control, primary separation, purification, virus filtration, formulation, and filling.

An embodiment of a system according to the invention comprises a container suitable for containing a source fluid, and an embodiment of the filter capsule, in fluid communication with the container. In some embodiments, the system includes one or more additional containers, e.g., a sampling container and/or a flush volume container. Alternatively, or additionally, embodiments of the system can further comprise one or more of any of the following: one or more vent devices (that may include sterile vent filters) and/or one or more aseptic or sterile connector or disconnectors and/or an integrity test instrument.

Advantageously, the module alignment element in a filter capsule aligns the filter module centrally within the filter capsule housing and promotes a uniformly distributed flow path between the outer diameter of the filter module and the inner walls of the filter capsule housing. The alignment element includes flow passages and includes a groove with one or more flattened portions for receiving a resilient member, an arrangement that allows easy axial movement of filter module, and aids alignment of the filter module in the capsule housing. The resilient member cushions the filter module within the filter capsule against external shock loads. Moreover, the module alignment element in the filter capsule avoids the noise that can be created when the filter module hits the internal side walls of the filter capsule housing, and thus, the module alignment element also provides an anti-rattle function.

In another advantage, filter capsules can be produced using extruded parallel tubes, providing continuous sections without (or with fewer) welded joints. The use of a continuous section to provide a filter capsule can also reduce hold up volume, as the parallel tube has a zero draft angle. In another advantage, parts of the upper and lower capsule housings including the bowl ends (and valves at the top and bottom of the filter, if desired) can be the same at each end of the filter, reducing the number of different parts (and part production operations) needed, while allowing for different fluid connection styles (e.g., sanitary flange, hose barb, snap-connection or screwed threaded connection) as desired.

In yet another advantage, the valves are operated by actuator knobs, separating movement of the valve spindle from the valve outlet port, preventing connected tubing from being turned, or stiffness of the connecting tubing influencing valve operation. The actuator knobs can be easily turned, and the shape of the knobs provides ready visual feedback as to whether the valve is open or closed. Moreover, the actuator knobs are not process wetted (i.e., they are not contacted with the fluid being filtered) so they can be constructed with different materials and have differentiating colors, which can assist in knob orientation and/or the knobs can be color coordinated with other elements (e.g., tubing connectors) in the filter capsule processing system, resulting in improved visibility, usability, and product alignment.

The valves connect the internal, upstream side of the filter module to the external environment of the filter capsule, and do not connect the downstream side of the filter. If desired, the location of the valves and knobs can make the filter capsules especially suitable for use in automated systems.

Embodiments of the invention include filtering fluid to remove undesirable material such as, for example, endotoxins, microbial contaminants, microorganisms, soluble and insoluble impurities and/or contaminants, bacteria and/or solid particles, from an aqueous fluid and/or gasses, in a wide variety of filtration applications, for example, but not limited to, the food and beverage industry, and the biopharmaceutical and pharmaceutical industries. Embodiments of the invention are particularly useful as "single use" filters for filtering fluids used in the biopharmaceutical and pharmaceutical industries at all process stages, such as, but not limited to final drug formulations, such as nanosuspensions including liposomes, emulsions, exosomes and nanospheres; recombinant proteins including monoclonal antibodies, antibody fragments, bispecific antibodies and antibody-drug conjugates; blood products including IVIG and Human Serum Albumin; small molecule drugs, for example, Doxorubicin; viruses for gene therapies including as Adeno Associated virus and Adenovirus; and RNA drugs.

Each of the components of the invention will now be described in more detail below, wherein like components have like reference numbers.

Using the embodiment illustrated in FIGS. 1, 2, 3A, and 3B for reference, a filter capsule 1000 comprises a filter capsule housing 900 including a hollow upper housing portion 910 including an upper housing portion first end 911 including an inlet 1 and a fitting section 1A, and an upper housing portion second end 912 including an upper bowl portion 915, a secondary upper bowl portion 916 having a section comprising a secondary upper bowl portion inner surface 917 including a secondary upper bowl portion fluid flow port 919 and a secondary upper bowl portion inner diameter 918, an intermediate hollow housing portion 930 having a side wall 932 (illustrated in FIG. 2 as parallel side walls in cross-sectional view, wherein the inner surface of the side wall is parallel to the outer surface of the outer filter module cage 620), and a hollow lower housing portion 950 including a lower housing portion first end 951 including an outlet 2 and a fitting section 2A, and a lower housing portion second end 952 including a lower bowl portion 955, a secondary lower bowl portion 956 having a section comprising a secondary lower bowl portion inner surface 957 including a secondary lower bowl portion fluid flow port 959 and a secondary lower bowl portion inner diameter 958, the capsule housing having a longitudinal axis A and defining a fluid flow path 100 between the inlet 1 and the outlet 2.

Figure 2:
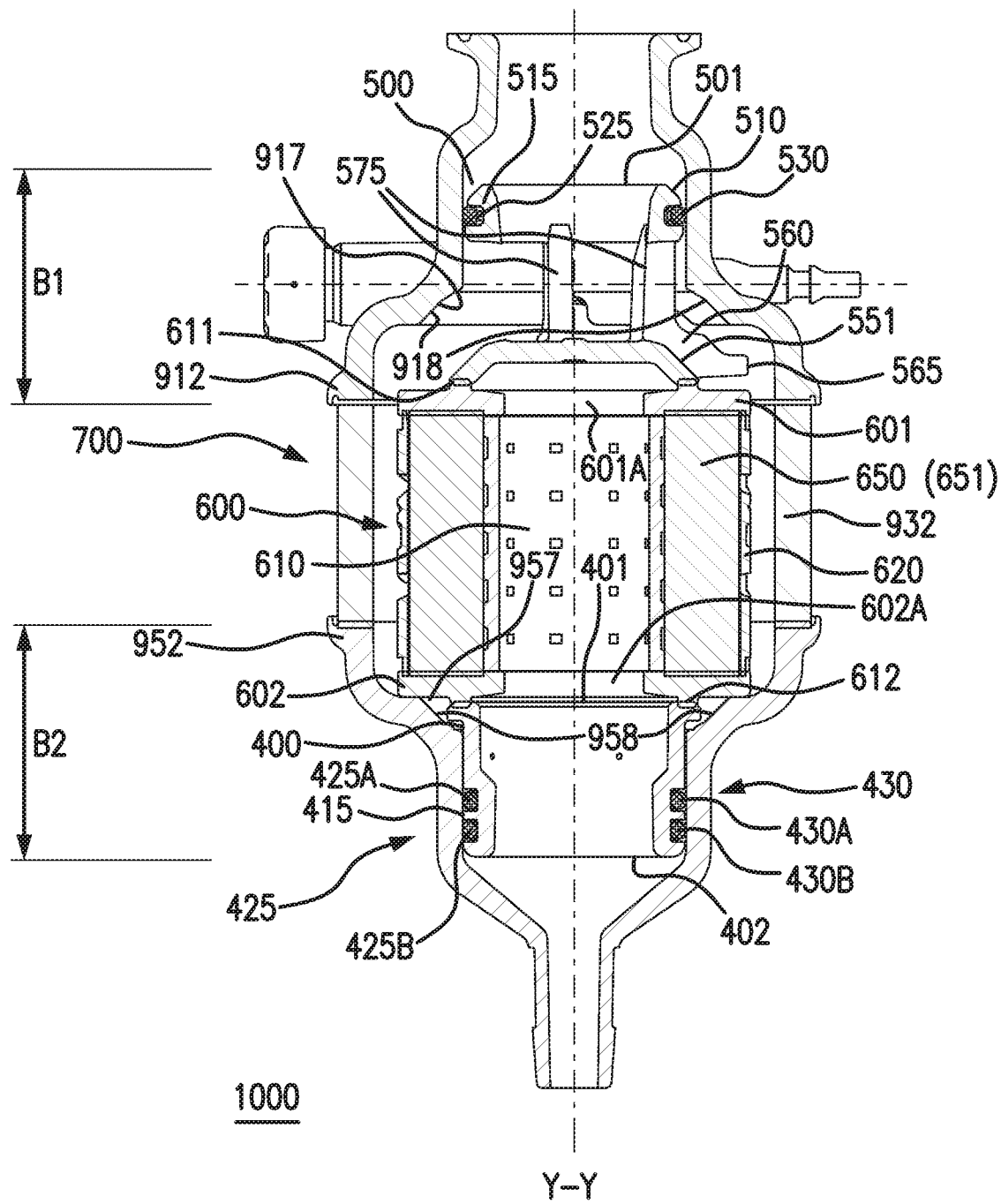

Preferably, as shown in FIGS. 1 and 2, the upper housing portion second end 912 including the upper bowl portion 915, the secondary upper bowl portion 916 having the section comprising the secondary upper bowl portion inner surface 917 including the secondary upper bowl portion fluid flow port 919 and the secondary upper bowl portion inner diameter 918 ("B1"), and the lower housing portion second end 952 including the lower bowl portion 955, the secondary lower bowl portion 956 having the section comprising the secondary lower bowl portion inner surface 957 including the secondary lower bowl portion fluid flow port 959 and the secondary lower bowl portion inner diameter 958 ("B2"), are identical. This common design reduces the number of different parts (and part production operations) needed, while allowing for different fluid connection styles (e.g., sanitary flange or hose barb) as desired.

Figure 3A:
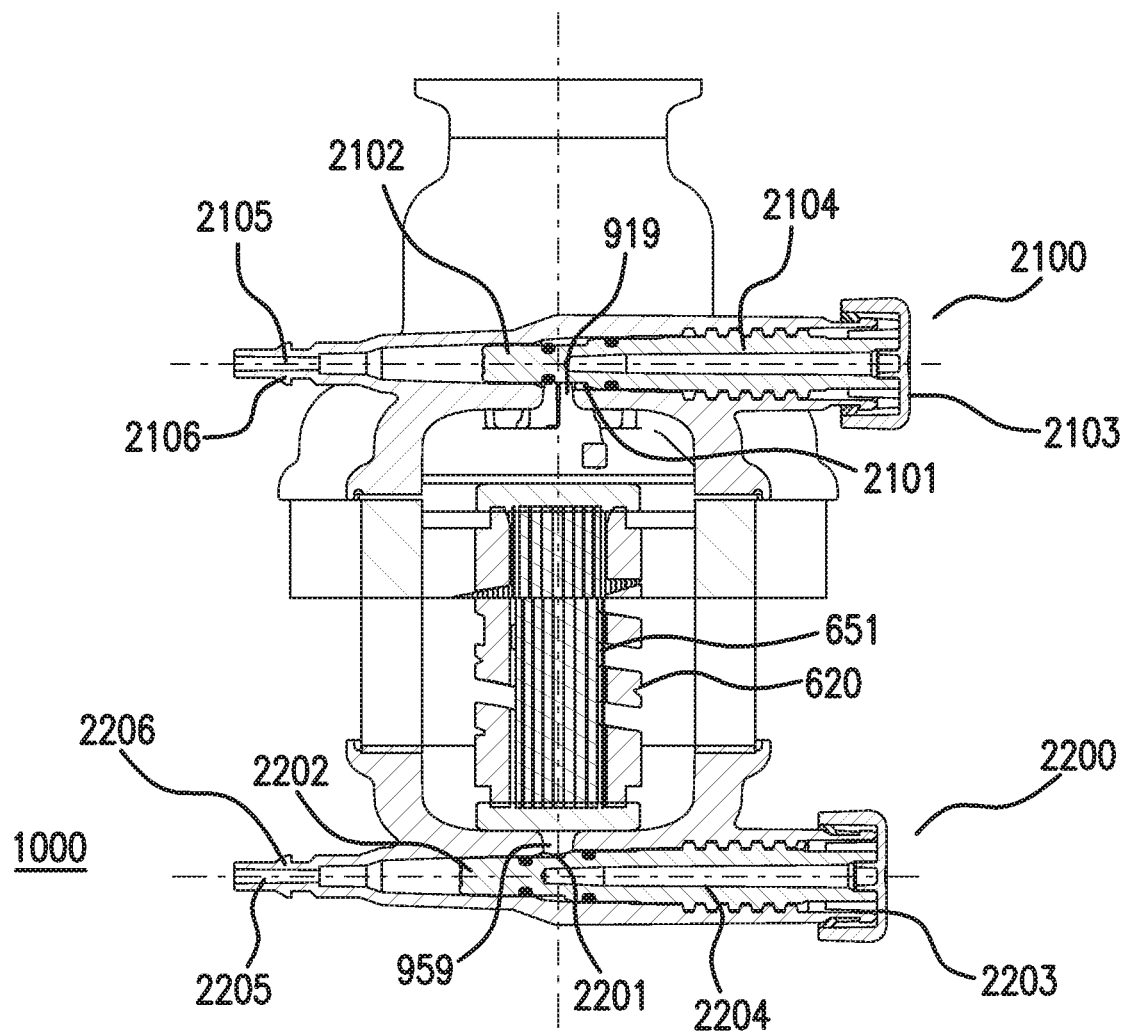
FIG. 3B is a view of a housing portion second end, showing a lower bowl portion having a section comprising a secondary bowl portion inner surface including a secondary bowl portion fluid flow port and a secondary bowl portion inner diameter.
Figure 5:
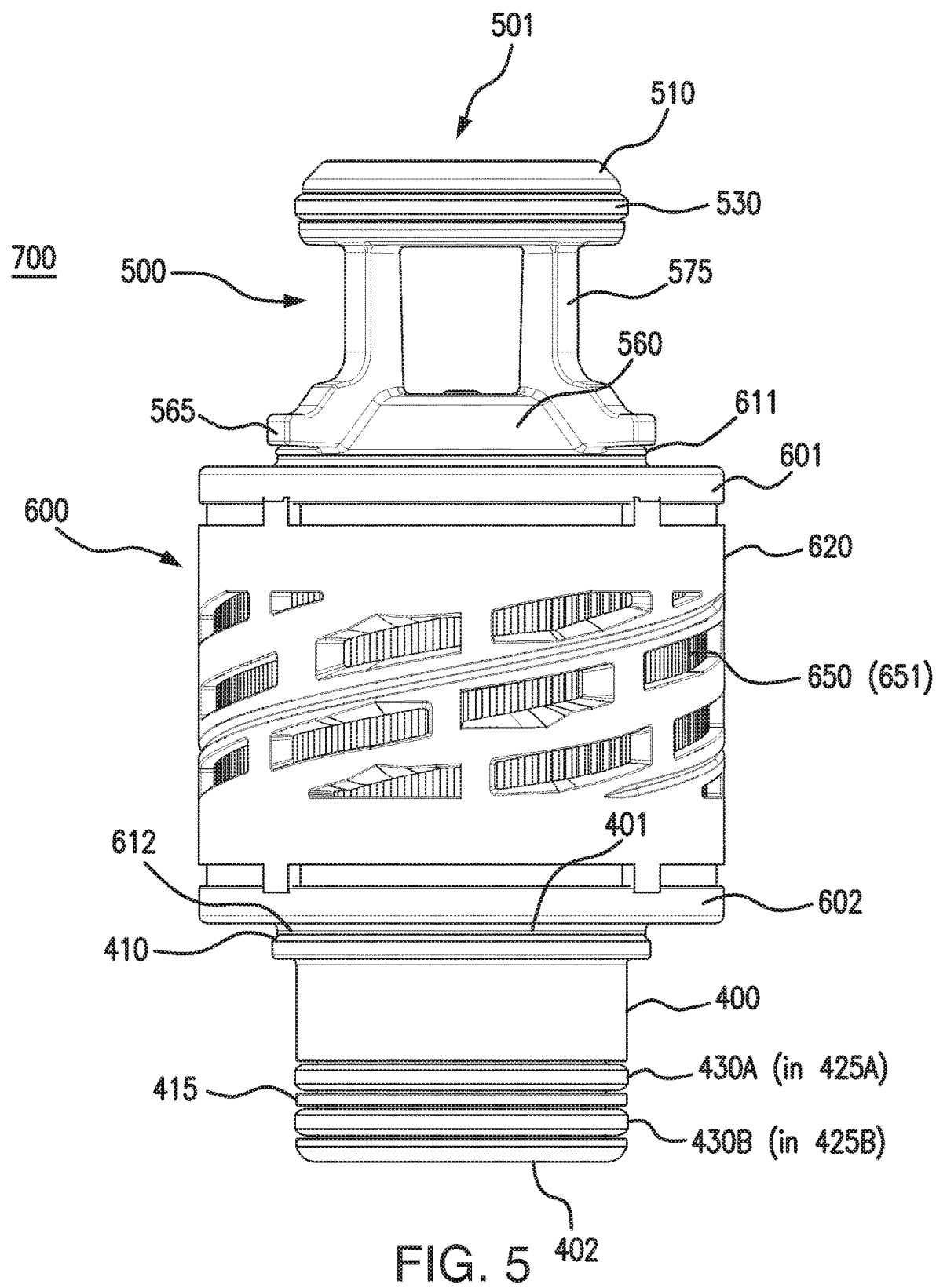
FIG. 5 shows an external side view of the filter cartridge as shown in FIG. 2, showing the module alignment element, the filter module, and the cap end.
Figure 6:
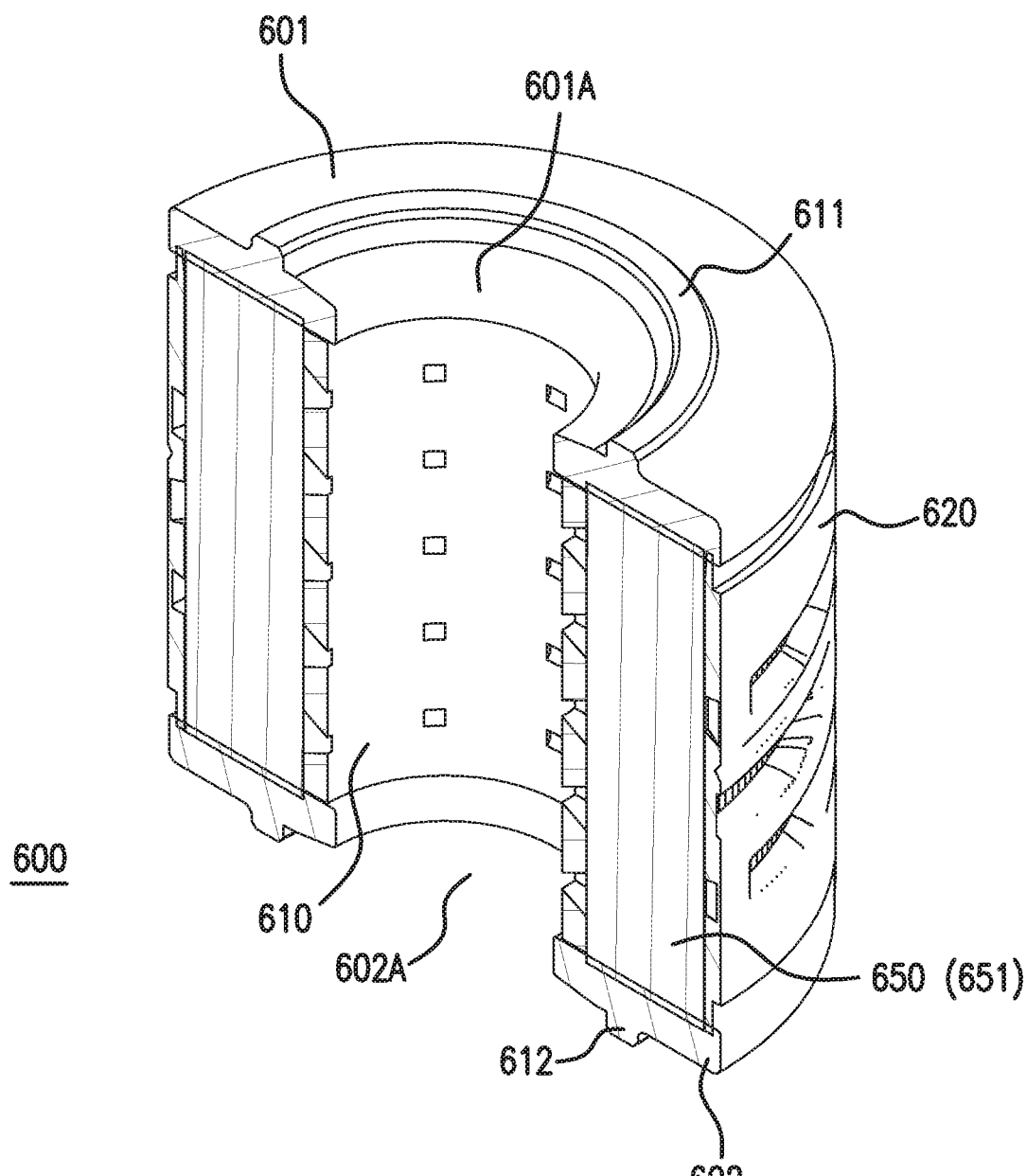
FIG. 6 is a cross-sectional perspective view of the filter module shown in FIG. 2.

The embodiment of the filter capsule illustrated in FIGS. 2, 3A, and 5 comprises a filter cartridge 700 including a filter module 600 (shown in more detail in FIG. 6) comprising a hollow cylindrical porous filter 650 comprising at least one hollow cylindrical porous filter element 651 (shown as a pleated filter element in FIG. 3) arranged between an inner core 610 and an outer cage 620, wherein the filter module is arranged in the capsule housing across the fluid flow path and the inner core and outer cage each have openings/perforations/cut outs allowing fluid flow therethrough, the filter module having an upper end cap 601 with a central opening 601A and a lower end cap 602 with a central opening 602A (each cap having a ring-shaped axially outwardly extending respective protrusion 611, 612 (shown in more detail in FIG. 6) arranged to respectively contact at least the peripheral edged of the bottom surface of the module alignment element 500 or the top surface of the cylindrical cap end 400). While the illustrated module shows a hollow cylindrical pleated porous filter, the module can include a variety of filters and filter configurations, including, for example, a wound filter or hollow fibers.

Figure 4C:
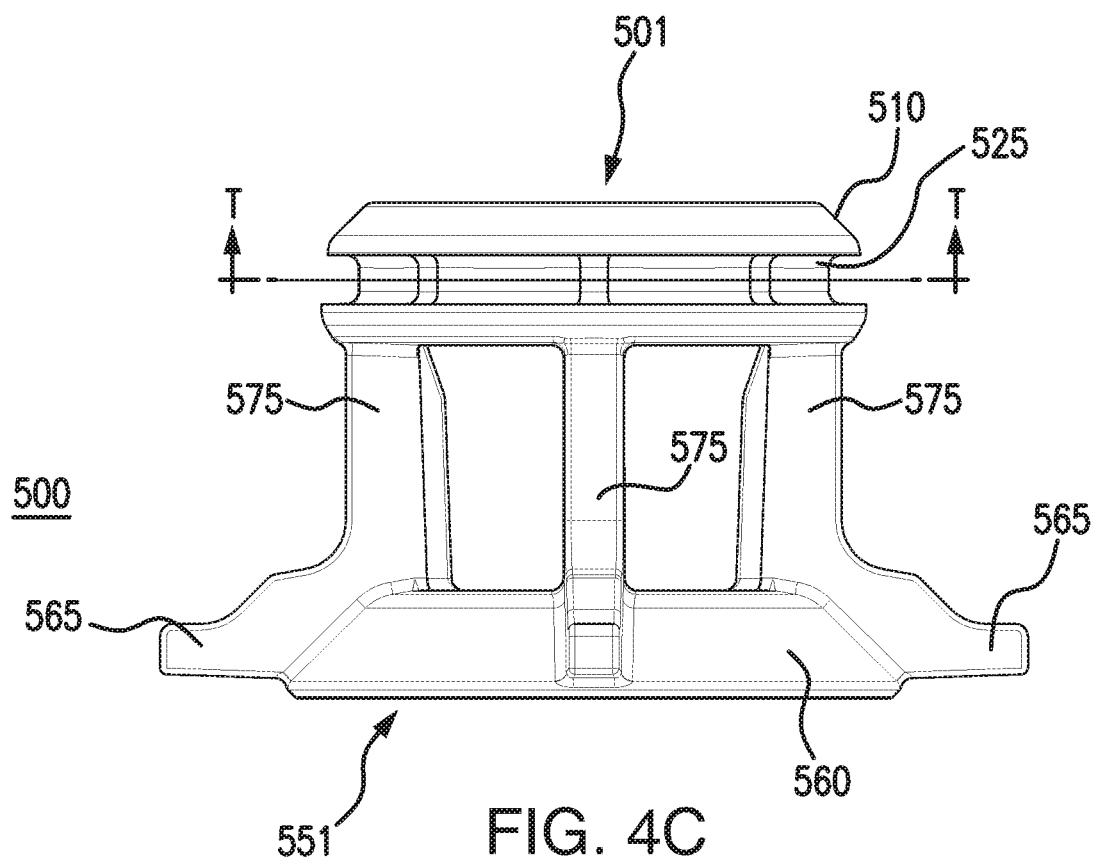
FIG. 4C shows a side view of the embodiment of the module alignment element shown in FIG. 4B.

The illustrated filter cartridge also includes a module alignment element 500 (shown in more detail in FIGS. 4A-4D), arranged in the upper housing portion 910 and arranged to contact the upper end cap 601 of the filter module, the module alignment element comprising an open top end 501 (shown having a chamfered upper surface or a beveled upper surface 510), and a closed bottom end 551 comprising a base 560 (shown with a generally concave bottom surface), the open top end and the closed bottom end being connected by a plurality (typically, at least three, preferably, four or more) of spaced apart vertically arranged struts 575 (thus allowing fluid to pass through the open end and exit the module alignment element via the spaces between the struts), the open top end including an outer side wall 515 including at least one circumferential groove 525 containing a resilient ring member 530 (illustrated as an o-ring, shown in FIGS. 2 and 5), the circumferential groove including two or more flattened portions 526A, 526B (shown in FIG. 4A, typically, they are spaced apart with an extended portion 527 in between).

Figure 4D:
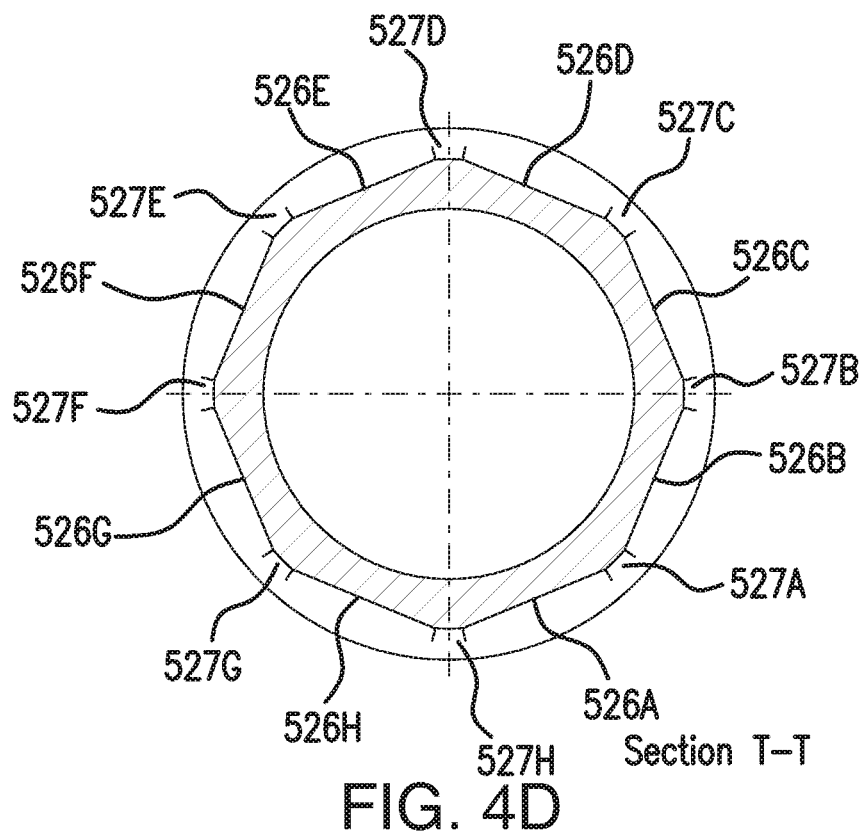
FIG. 4D shows flattened portions of the groove along line T-T of FIG. 4C.

In the illustrated embodiment shown in FIG. 4D, when viewed from the top or bottom, the groove has an octagonal appearance, and flattened portions 526A, 526B, 526C, 526D, 526E, 526F, 526G, and 526H, with extended portions 527A, 527B, 527C, 527D, 527E, 527F, 527G, and 527H between the flattened portions (such that the resilient ring member on the extended portions provides pinch points that further assist in the anti-rattle function) formed in the side wall. The illustrated base 560 comprises a plurality (typically, at least three, preferably, four or more) of horizontally arranged outwardly extending ears 565 (shown arranged radially; also shown as integrally formed with the struts 575), the horizontally arranged outwardly extending ears extending beyond the secondary upper bowl portion inner diameter 918. The ears 565 as illustrated include shoulders 565A, and can contact the inner surface of the secondary upper bowl portion forming inner diameter 918.

The illustrated filter cartridge also includes a hollow cylindrical cap end 400 having an open upper end 401 (shown in FIG. 5 having a chamfered upper surface or a beveled upper surface 410), and an open lower end 402, arranged in the lower housing portion and contacting the lower end cap 602 of the filter module, the hollow cap end comprising a side wall 415 including at least one circumferential groove 425 containing a resilient ring 430 (FIG. 2 illustrates two circumferential grooves 425A, 425B, and associated rings 430A, 430B (illustrated as o-rings)), the resilient ring(s) providing a seal when the cap end 400 is arranged in the lower housing portion 950.

While both the module alignment element and the filter cartridge can move axially in the filter capsule housing, the ears 565 prevent excessive movement of the module from disengaging the seals at the lower end of the cap end.

In contrast with the arrangement of the groove(s) 425 and ring(s) 430 on the hollow end cap 400, wherein the ring(s) provide a seal with the cap end 400 is arranged in the lower housing portion 950, the circumferential groove 525 having two or more flattened portions 526A, 526B and containing a resilient ring member 530 on the module alignment element 500, provides a buffer, allowing for axial movement, but does not necessarily provide a seal.

Preferably, the filter capsule is arranged for "outside-in" flow through the filter cartridge, such that, during filtering (wherein the valves 2100 and 2200 (discussed below) are closed) fluid flows through the inlet 1, the module alignment element 500, the outer cage 620, the hollow cylindrical porous filter 650 comprising at least one hollow cylindrical porous filter element 651, the inner core 610, and the outlet 2.

Figure 7:
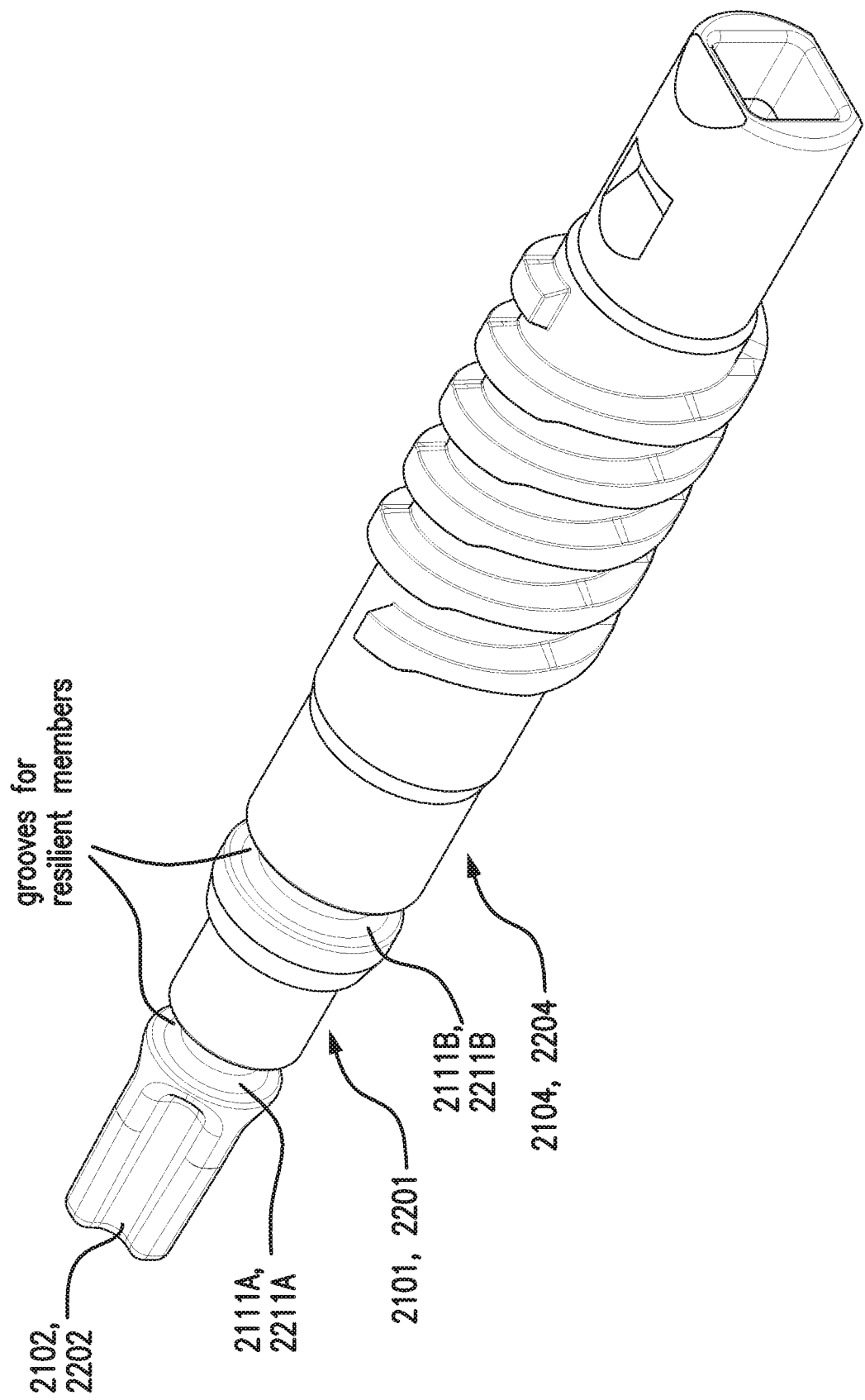
FIG. 7 is an isometric view of the valve spindle of a valve shown in FIG. 3.
Figure 8:
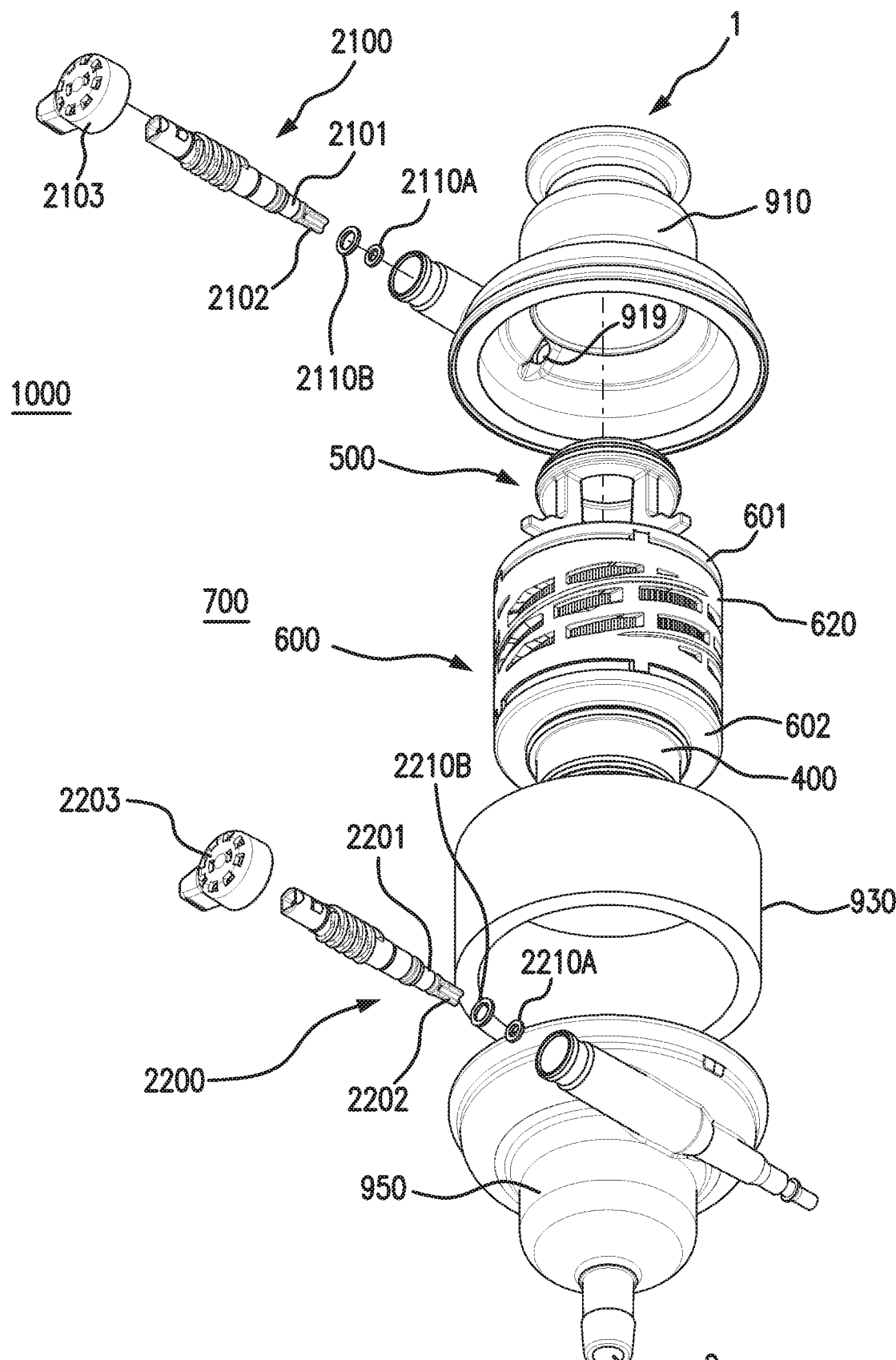
FIG. 8 is an exploded view of the filter capsule shown in FIG. 1.

Typically, the filter capsule includes at least one valve 2000, preferably, two valves (which can be vent valves), and the embodiment shown in FIGS. 1, 3A, and 8 includes an upper valve 2100 and a lower valve 2200. Preferably, the valves are configured to be operated by actuator knobs, separating movement of the valve spindle from the valve outlet port, preventing connected tubing from being turned, or stiffness of the connecting tubing influencing valve operation. Using FIGS. 3A and 7 for reference, each valve preferably comprises a respective valve inlet 2101, 2201 communicating with ports 919, 959 (FIG. 3A), a valve outlet 2102, 2202, an actuator knob 2103, 2203, a valve spindle 2104, 2204 (each typically including at least one resilient sealing member such as an o-ring fitting in a respective groove; FIG. 8 illustrates two o-rings 2110A, 2110B; 2210A, 2210B associated with each spindle; FIG. 7 shows a valve spindle without resilient sealing members in grooves 2111A, 2111B; 2211A, 2211B), a valve outlet port 2105, 2205, and an outlet fitting 2106, 2206.

While FIG. 3A show the outlets 2102 and 2202 having connections in a format for connection with quick connectors, a variety of other formats and connectors are suitable, as known in the art.

The use of valves can be desirable for venting air, draining fluid, integrity testing, and taking samples.

For example, in one embodiment of a method according the invention, the filter capsule is primed as follows: Both valves are initially closed, and the fluid flow path downstream of the outlet is closed, fluid is introduced through the inlet, when the capsule is almost filled with fluid, the upper valve is partially opened until all the air or gas is vented, and the upper valve is closed.

Subsequently, the fluid flow path downstream of the outlet is opened, and fluid is filtered as it passes through the filter capsule.

In another embodiment of a method according to the invention, after filtration, filtered air is introduced through the inlet, or through the upper valve after the valve is opened, so that additional filtered fluid can be pushed out and recovered.

Alternatively, or additionally, in another embodiment of a method according to the invention, integrity testing can be carried out, wherein an integrity test device is connected to either the upper valve or the lower valve, the appropriate valve is opened, and integrity testing is carried out, followed by closing the valve.

Alternatively, or additionally, in yet another embodiment of a method according to the invention, sampling can be carried out, wherein a valve (typically, the lower valve) is slowly opened, a small volume of fluid is taken for analysis, and the valve is closed.

Alternatively, or additionally, in yet another embodiment of a method according to the invention, draining can be carried out, wherein a valve (typically, the lower valve) is opened, and the filter capsule is drained of internal fluid.

When upper valve 2100 is open, fluid passes through the secondary upper bowl portion fluid flow port 919 through upper valve inlet 2101 of upper valve 2100, and when lower valve 2200 is open, fluid passes through the secondary lower bowl portion fluid flow port 959 through lower valve inlet 2201 of lower valve 2200.

Typically, the first ends 911, 951 of the upper and lower housing portions 910, 950 each include a fitting section that may include any of a wide variety of fittings for coupling the upper and lower housing portions to a hose, pipe, tubing or other conduit of a fluid processing system. For example, a fitting may be configured as the sanitary flange fitting or a hosebarb as shown in many of the Figures (or as a threaded connection or a snap connector). The fittings can have any suitable inside and/or outside diameter as is known in the art. Typical fittings include, for example, ¼", ⅜", ½", ⅝" hosebarb fittings and ½," ¾," 1," and 1.5" sanitary end fittings, but other suitable fittings are known in the art.

The inner diameter can vary along the axis of the filter capsule between the first and second ends of the upper and/or lower housing portions. For example, in the illustrated embodiments, the upper and lower housing portions each include a bowl portion 915, 955 which includes the second end 912, 952 and a uniform inner diameter; a fitting section 1A, 2A which includes the first end 911, 951 and having an inner diameter less than the inner diameter of the bowl portions 915, 955; and a secondary portion 916, 956 between the first ends and the second ends, and having a section having an inner diameter 918, 958 smaller than the inner diameters of the bowl portions and larger than the inner diameters of the fitting sections.

Figure 3B:
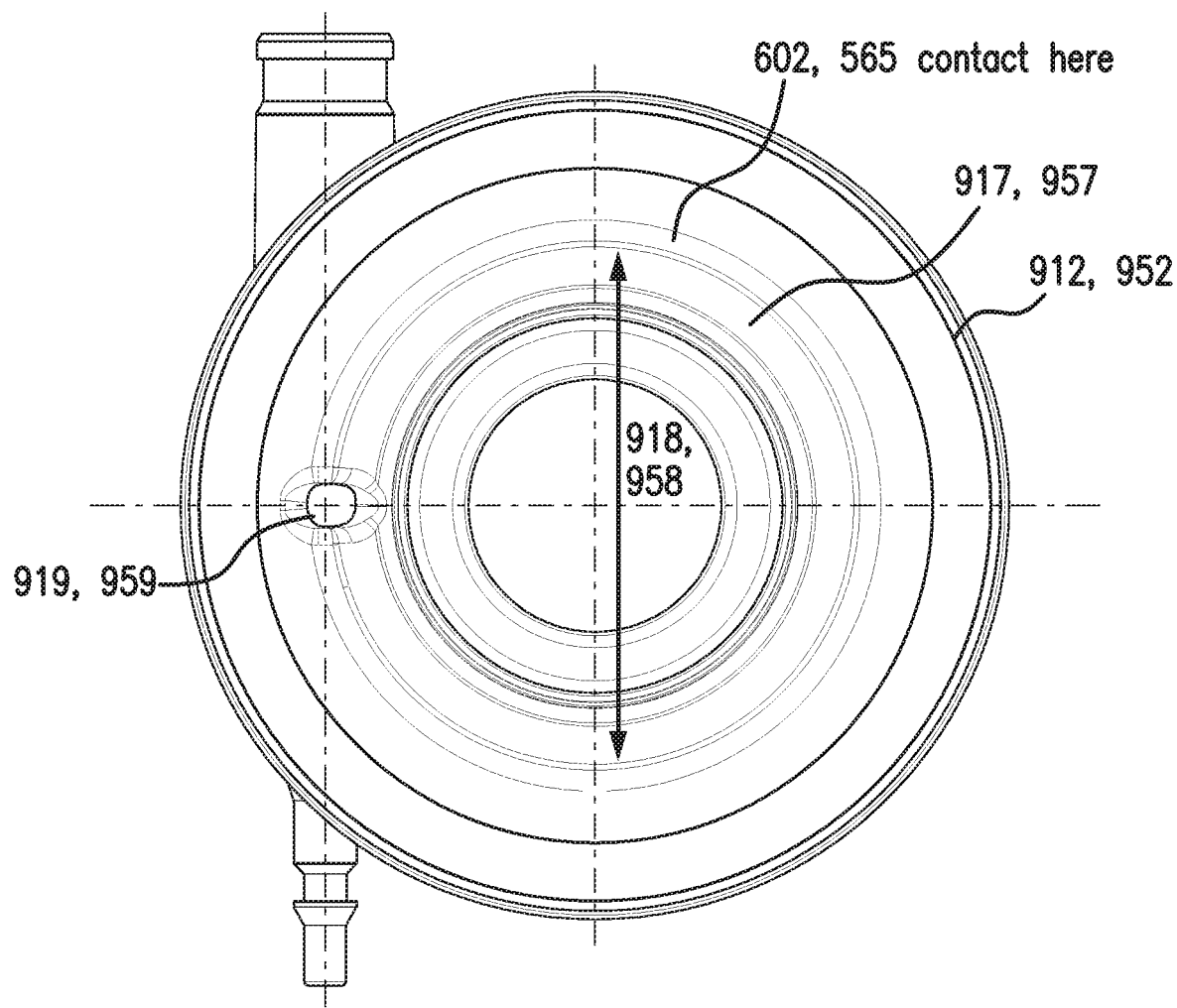

In the illustrated embodiment, using FIGS. 1 and 2 for reference, the secondary portions 916, 956 can have an inner diameters (e.g., due to a concave inner surface) that increases in the direction toward the filter, wherein the inner diameter 918, 958 is the greatest inner diameter. As shown in FIGS. 2 and 3B, the ends of horizontally arranged outwardly extending ears 565 of the module alignment element extend beyond the secondary upper bowl portion inner diameter 918 (preferably, wherein the ears include shoulders 565A contacting the inner surface of the secondary upper bowl portion), and as shown in FIG. 2, the outer diameter of the lower end cap 602 extends beyond the secondary lower bowl portion inner diameter 958.

Typically, the outlet ends of the valves each include a fitting for coupling to components of a fluid processing system such as, for example, conduits. If desired, a valve can be connected to a sterile vent filter. In one embodiment, as noted above, the fitting is suitable for use with quick release connectors.

Figure 9:
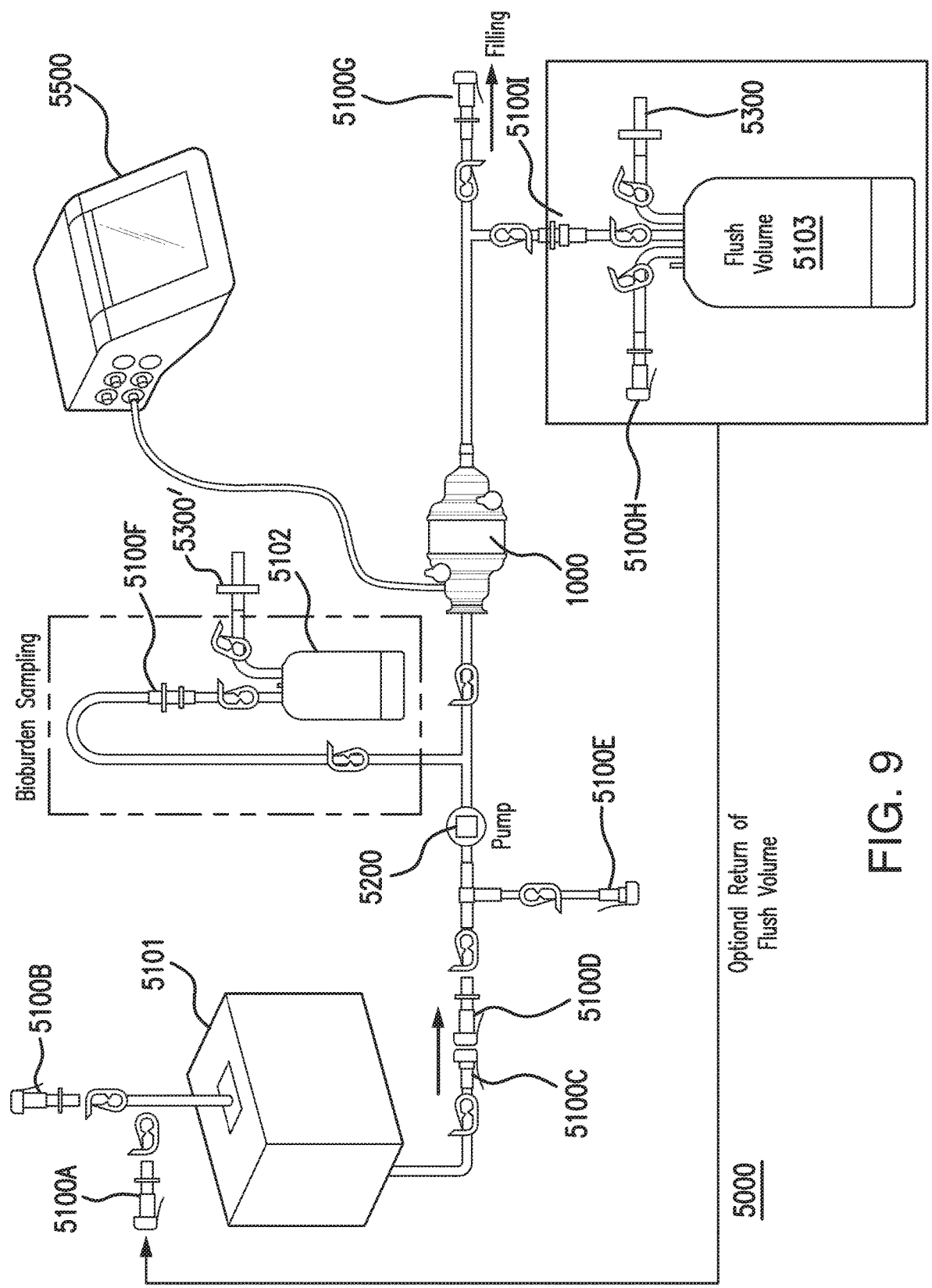
FIG. 9 illustrates embodiments of filter systems including an embodiment of the filter capsule, showing a system being used in single stage filtration and/or in bioburden sampling and/or in integrity testing and/or in process containment.
Figure 10:
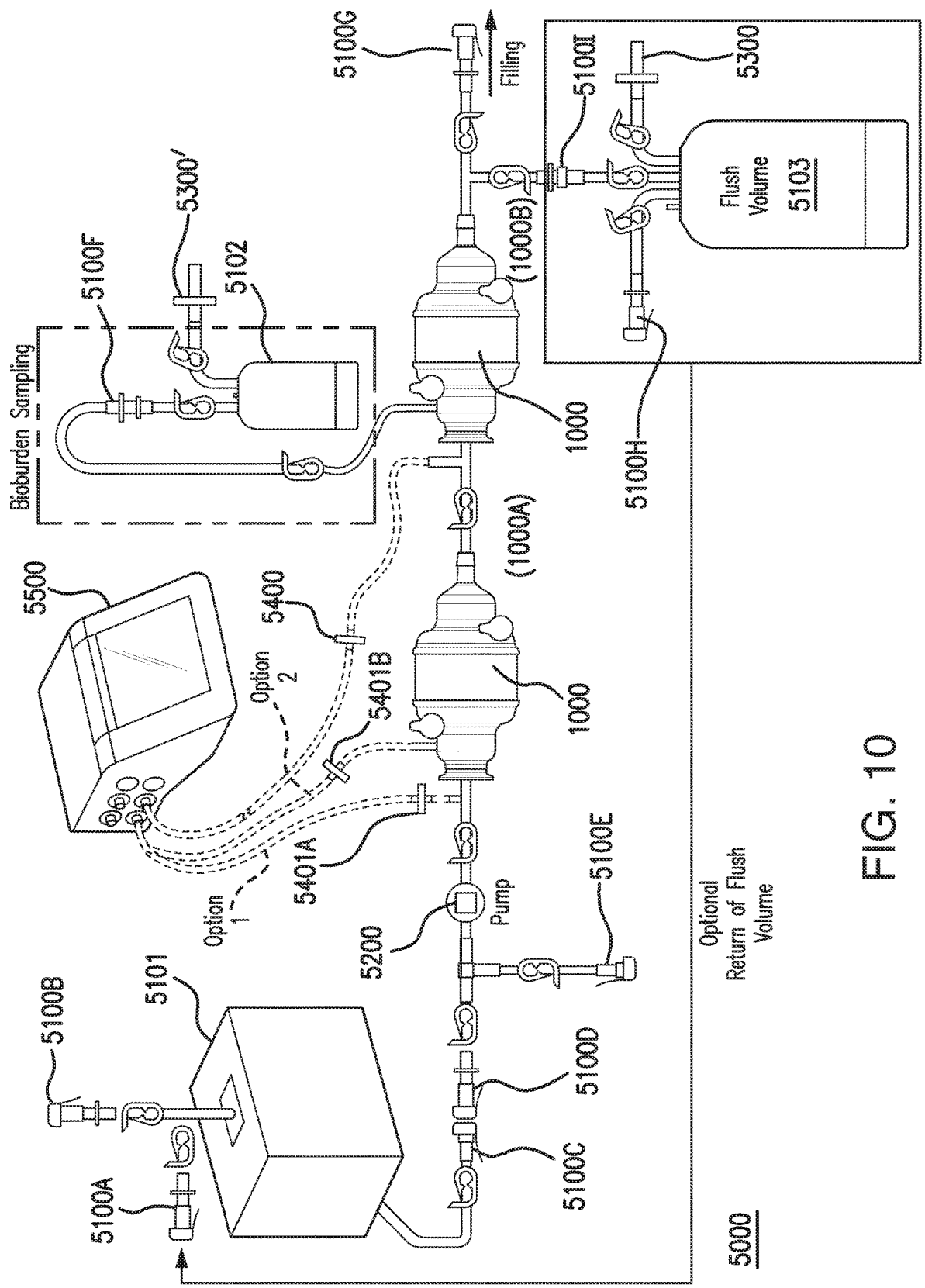
FIG. 10 illustrates other embodiments of filter systems including an embodiment of the filter capsule, showing a system being used in serial filtration and/or in bioburden sampling and/or in integrity testing.

FIGS. 9 and 10 show illustrative embodiments of systems including embodiments of filter capsules in fluid communication with an integrity test instrument 5500.

FIG. 9 shows filter system 5000 including one or more containers, e.g., a source container 5101, a plurality of conduits, flow control devices (e.g., clamps and/or valves), filter capsule 1000, and a pump 5200, wherein components of the system are placed in fluid communication via conduits, and connector and/or disconnector assemblies 5100 (labeled as 5100A-5100I), preferably aseptic or sterile connector/disconnector assemblies. In some embodiments, the assemblies are male and female connectors, e.g., 5100C could be a male connector and 5100D could be a female connector, or vice versa). A variety of connector and disconnector assemblies are suitable, especially suitable connectors and disconnectors include those disclosed in U.S. Patent Application Publication No. US 2017/0284584, and those available as KLEENPACK Presto Sterile Connectors and KLEENPACK Sterile Disconnectors (Pall Corporation, Port Washington, N.Y.).

In one embodiment, fluid is passed from a source container 5101 and filtered by passing through filter capsule 1000, providing single stage filtration. In another embodiment, if desired, bioburden sampling can be carried out by collecting a sample in container (e.g., a bag) 5102 upstream of the capsule filter (optionally, a vent device 5300', that may include a sterile vent filter, can be attached to container 5102, as shown in FIG. 10). Preferably, this is carried out using aseptic or sterile connectors and disconnectors, thus minimizing the risk of system and sample contamination. Alternatively, or additionally, integrity testing, including pre- and post-use integrity testing, can be carried out wherein an integrity test instrument 5500 for testing integrity is in fluid communication with the system. If desired, a capsule filter can be integrity tested before it is connected into a process and the sterile connectors associated with the filter capsule inlet and outlet are activated. This means that the filter capsule can be confirmed as integral and suitable for use before it is permanently installed within a process. A variety of integrity test instruments are suitable for use in accordance with embodiments of the invention, for example, a PALLTRONIC Flowstar IV Filter integrity test instrument, or a PALLTRONIC Flowstar IV Filter integrity test instrument MUX Extension, or a PALLTRONIC Flowstar LGR test instrument, or a PALLTRONIC AquaWIT IV Filter Integrity Test System; Pall Corporation, Port Washington, N.Y. In some embodiments including the use of an integrity test instrument, a high pressure manifold section is located upstream of the capsule filter to be tested, and if desired, integrity test connectivity can be provided by a pneumatic fitting molded on the filter capsule vent valve.

Alternatively, or additionally, a flush volume container 5103 (shown as a bag with a vent device 5300 (that may include a sterile vent filter), for venting when receiving the flush volume) can be utilized to allow the aseptic return of flush volume to the unfiltered fluid bulk upstream of the filter capsule, thus minimizing product losses where product is used for the filter wetting step. This also dilutes extractables into the unfiltered bulk fluid.

FIG. 10 shows filter system 5000 including one or more containers, e.g., a source container 5101, two filter capsules 1000 (1000A, 1000B), sterile filter 5400, a plurality of conduits, flow control devices, and a pump 5200, wherein components of the system are placed in fluid communication via connector and/or disconnector assemblies 5100, wherein the connector and/or disconnector assemblies are as described with respect to FIG. 9.

In one embodiment, fluid is passed from a source container 5101 and filtered by passing through filter capsule 1000A, followed by passing through filter capsule 1000B, providing double stage filtration. If desired, the illustrated embodiment of the system allows for bioburden sampling and integrity testing as described with respect to FIG. 9, and ensures sterility is maintained between the two capsule filters, an absolute requirement of double filtration, where the combined filters provide the enhanced level of sterility assurance, and redundant filtration where in instances of integrity test failure of capsule filter 1000B (the second filter in series) capsule filter 1000A can be considered the critical filter and a sterile environment downstream of that filter will be assured. Pre-use flushing of the filters can be performed in series with the flush fluid being directed to the single container 5103 positioned on the downstream side of filter capsule 1000B, and provision for the aseptic return of that flush fluid volume to the unfiltered fluid bulk upstream of filter capsule 1000A can be made should the process allow and require it.

Pre-use integrity testing should be performed sequentially to a defined procedure, with capsule filter 1000A being tested first using the sterile filter 5400 immediately downstream of capsule filter 1000A as the integrity test gas exhaust point. Following completion of the test of capsule filter 1000A, capsule filter 1000B can be tested with exhaust gas being directed to the downstream flush container 5103. By testing capsule filter A first, fluid is introduced into the system, making the subsequent testing of capsule filter B easier. A vent filter 5300 is associated with the flush container to provide an exhaust point to minimise the risk of over pressurisation of the flush container during the testing stage.

For post-use testing, it may be desirable to test capsule filter B first, and testing of capsule filter A may be optional.

In other options for integrity testing, e.g., using FIG. 10 for reference, an integrity test instrument can be placed in fluid communication with the system via option 1, including optional sterile filter 5401A, upstream of a filter capsule, or via option 2, connected to the upper valve of the filter capsule, including optional sterile filter 5401B. The line containing sterile filter 5400 is shown with a gap between integrity test instrument 5500 and sterile filter 5400, since, if integrity testing is carried out using option 1 or option 2, exhaust should exit sterile filter 5400 to atmosphere, rather than returning to integrity test instrument 5500.

In some embodiments including bioburden sampling, a capsule filter could be arranged vertically, and if desired, the bioburden bag 5102 can be placed in communication with the lower valve of the filter capsule.

A wide variety of conduits, connectors, flow control devices (e.g., clamps and/or valves), containers, and vent devices are known in the art. Flexible containers (bags) and conduits can be made from, for example, from plasticized polyvinyl chloride; ethylene butyl acrylate copolymer (EBAC) resin; ethylene methyl acrylate copolymer (EMAC) resin; plasticized ultra-high-molecular weight PVC resin; ethylene vinyl acetate (EVA). The bags and/or conduits can also be formed from, for example, polyolefin, polypropylene, polyurethane, polyester, and polycarbonate and combinations of materials.

A variety of filters, filter media (e.g., fibrous media, membranes, and/or composites), filter elements, and filter modules are suitable for use in filter cartridges and filter modules according to the invention. Suitable filters include, for example, ULTIPLEAT® filters (Pall Corporation, Port Washington, N.Y.). Exemplary filters and filter elements, including pleated filters, and "laid-over-pleat" (LOP) filter configurations, are disclosed in, for example, U.S. Pat. Nos. 5,543,047 and 5,552,048.

A filter and filter element can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

A filter and filter element can have any desired critical wetting surface tension (CWST, as defined in, for example, U.S. Pat. No. 4,925,572). The porous membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the filter element has a CWST of greater than about 53 dynes/cm (about $53 \times 10^{-5}$ N/cm). In some embodiments, the element has a CWST of 75 dynes/cm (about $75 \times 10^{-5}$ N/cm) or more. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface.

The filter can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen.

The filter, in some embodiments comprising a plurality of filter elements (typically, the filter is arranged between an outer cage and an inner core to provide a filter module) is disposed in a housing comprising an inlet and an outlet and defining a fluid flow path between the inlet and the outlet, wherein the filter is across the fluid flow path, to provide a filter capsule. Preferably, the filter capsule is sterilizable as is known in the art (e.g., autoclaved, gamma irradiated, etc.). Any housing of suitable shape and providing an inlet and an outlet may be employed.

The capsule filter housing can be fabricated from any suitable rigid impervious material, including any impervious thermoplastic material, which is compatible with the fluid being processed. While the housing could be fabricated from a metal (e.g., stainless steel), in a preferred embodiment, the housing is fabricated from a polymer, such as an acrylic, polypropylene, polystyrene, or a polycarbonated resin. In a more preferred embodiment, the housing is fabricated from extruded polypropylene.

The module alignment element can be fabricated from any suitable impervious material which is compatible with the fluid being processed. In a preferred embodiment, the module alignment element is fabricated from polypropylene.

Embodiments of the invention are suitable for use in a variety of fluid processing systems and applications, including those utilizing a variety of bioreactors and/or single use technology (SUT) applications. Alternatively, or additionally, embodiments of the invention are especially suitable with a variety of connector assemblies, including, but not limited to, those disclosed in U.S. Patent Application Publication No. US 2017/0284584. If desired, embodiments of the filter capsule (e.g., components such as the actuator knobs) can be color coded consistent with the color coding described in U.S. Patent Application Publication No. US 2017/0284584, allowing system customization and identification, which can reduce connection errors, including multi-connection errors (e.g., fluid systems, such as fluid systems including bioreactors, can include a plurality of connections, such as fluid inlet ports, drain ports, sampling ports, vent ports, etc.), wherein the colors can provide a visual labeling guide for the various connections.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter capsule comprising
(a) a hollow filter capsule housing having an upper hollow housing portion including an inlet, the upper hollow housing portion including an upper bowl portion, a secondary upper bowl portion including a secondary upper bowl portion fluid flow port and a secondary upper bowl portion inner diameter; an intermediate hollow housing portion; a lower hollow housing portion including an outlet, the lower hollow housing portion including a lower bowl portion, a secondary lower bowl portion including a secondary lower bowl portion fluid flow port; and defining a fluid flow path between the upper hollow housing portion and the lower hollow housing portion;

(b) a filter module comprising a hollow cylindrical porous filter arranged between an inner core and an outer cage, wherein the filter module is arranged in the hollow filter capsule housing across the fluid flow path, the filter module having an upper end cap with a central opening and a lower end cap with a central opening;

(c) a module alignment element, arranged in, and moveable axially in, the upper hollow housing portion and arranged to contact the upper end cap of the filter module, the module alignment element comprising an open top end, and a closed bottom end comprising a base, the open top end and the closed bottom end being connected by a plurality of spaced apart vertically arranged struts, the open top end including an outer side wall including a circumferential groove containing a resilient ring, the circumferential groove including two or more flattened portions formed in the side wall; the base comprising a plurality of horizontally arranged outwardly extending ears, the plurality of horizontally arranged outwardly extending ears extending beyond the secondary upper bowl portion inner diameter, wherein the plurality of horizontally arranged outwardly extending ears can contact an inner surface of the secondary upper bowl portion forming the inner diameter; and, (d) a hollow cylindrical end cap, arranged in the lower hollow housing portion and contacting the lower end cap of the filter module, the hollow cylindrical end cap comprising a side wall including at least one circumferential groove containing a hollow end cap resilient ring, the hollow end cap resilient ring providing a seal when the hollow cylindrical end cap is arranged in the lower hollow housing portion.

2. The filter capsule of claim 1, further comprising:

(e) a valve in fluid communication with the upper hollow housing portion or the lower hollow housing portion.

3. The filter capsule of claim 1, further comprising:

(e) a first valve in fluid communication with the upper hollow housing portion and a second valve in fluid communication with the lower hollow housing portion.

4. The filter capsule of claim 2, wherein the valve comprises a valve outlet port, a valve spindle, and an actuator knob, and operation of the actuator knob moves the valve spindle to open and close the valve without moving the valve outlet port.

5. A method of filtering fluid, the method comprising: passing fluid through a filter capsule comprising (a) a hollow filter capsule housing having an upper hollow housing portion including an inlet, the upper hollow housing portion including an upper bowl portion, a secondary upper bowl portion including a secondary upper bowl portion fluid flow port and a secondary upper bowl portion inner diameter; an intermediate hollow housing portion; a lower hollow housing portion including an outlet, the lower hollow housing portion including a lower bowl portion, a secondary lower bowl portion including a secondary lower bowl portion fluid flow port; and defining a fluid flow path between the upper hollow housing portion and the lower hollow housing portion;

(b) a filter module comprising a hollow cylindrical porous filter arranged between an inner core and an outer cage, wherein the filter module is arranged in the hollow filter capsule housing across the fluid flow path, the filter module having an upper end cap with a central opening and a lower end cap with a central opening;

(c) a module alignment element, arranged in, and moveable axially in, the upper hollow housing portion and arranged to contact the upper end cap of the filter module, the module alignment element comprising an open top end, and a closed bottom end comprising a base, the open top end and the closed bottom end being connected by a plurality of spaced apart vertically arranged struts, the open top end including an outer side wall including a circumferential groove containing a resilient ring, the circumferential groove including two or more flattened portions formed in the side wall; the base comprising a plurality of horizontally arranged outwardly extending ears, the plurality of horizontally arranged outwardly extending ears extending beyond the secondary upper bowl portion inner diameter, wherein the plurality of horizontally arranged outwardly extending ears can contact an inner surface of the secondary upper bowl portion forming the inner diameter; and, (d) a hollow cylindrical end cap arranged in the lower hollow housing portion and contacting the lower end cap of the filter module, the hollow cylindrical end cap comprising a side wall including at least one circumferential groove containing a hollow end cap resilient ring, the hollow end cap resilient ring providing a seal when the hollow cylindrical end cap is arranged in the lower hollow housing portion.

6. The method of claim 5, further comprising, after passing fluid through the filter capsule, introducing filtered air into the filter capsule, and obtaining additional filtered fluid.

7. The method of claim 6, wherein introducing filtered air into the filter capsule comprises opening a valve in fluid communication with the upper hollow housing portion and introducing the filtered air through the valve.

8. A fluid processing system comprising a container suitable for containing a source fluid;

the filter capsule of claim 1, in fluid communication with the container.

9. The filter capsule of claim 3, wherein the first and second valves each comprise a valve outlet port, a valve spindle, and an actuator knob, and operation of the actuator knob moves the valve spindle to open and close the valve without moving the valve outlet port.

10. The method of claim 5, wherein passing fluid through the filter capsule includes integrity testing the filter capsule.

11. The filter capsule of claim 1, wherein the filter module is moveable axially in the filter capsule, and the plurality of horizontally arranged outwardly extending ears prevent excessive movement of the filter module.

12. The filter capsule of claim 11, wherein the upper end cap and the lower end cap of the filter module each include protrusions arranged to respectively contact at least a peripheral edge of a bottom surface of the closed bottom end of the module alignment element or a top surface of the cylindrical end cap.

13. The method of claim 5, wherein the filter module is moveable axially in the filter capsule, and the plurality of horizontally arranged outwardly extending ears prevent excessive movement of the filter module.

14. The method of claim 13, wherein the upper end cap and the lower end cap of the filter module each include protrusions arranged to respectively contact at least a peripheral edge of a bottom surface of the closed bottom end of the module alignment element or a top surface of the cylindrical end cap.

* * * * *